A. BAAS.
POTATO HARVESTER.
APPLICATION FILED NOV. 24, 1911.
1,032,175.
Patented July 9, 1912.
3 SHEETS—SHEET 2.
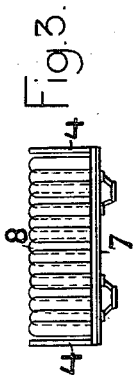
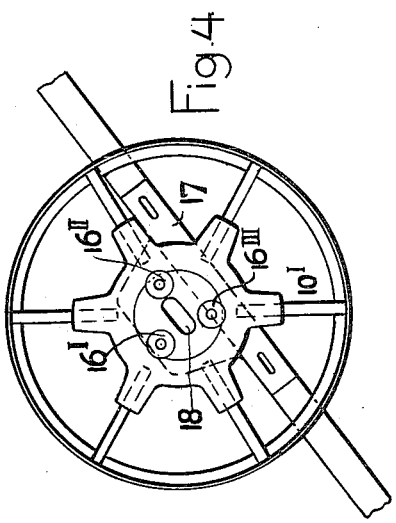
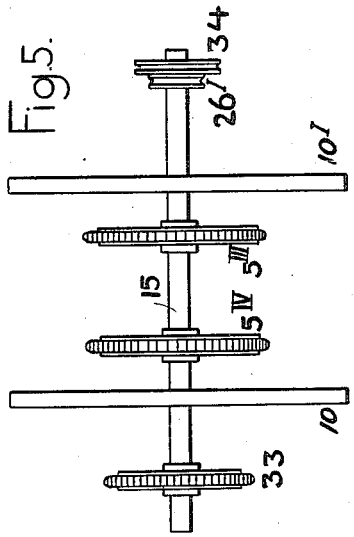
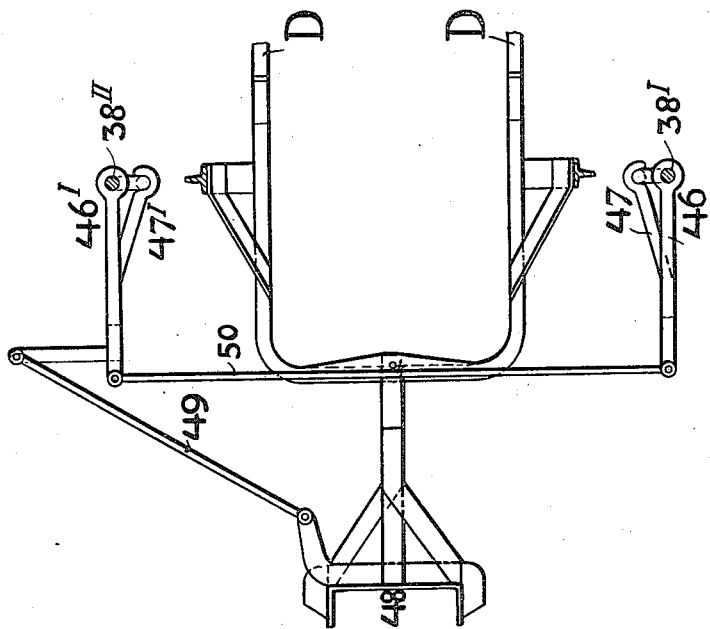

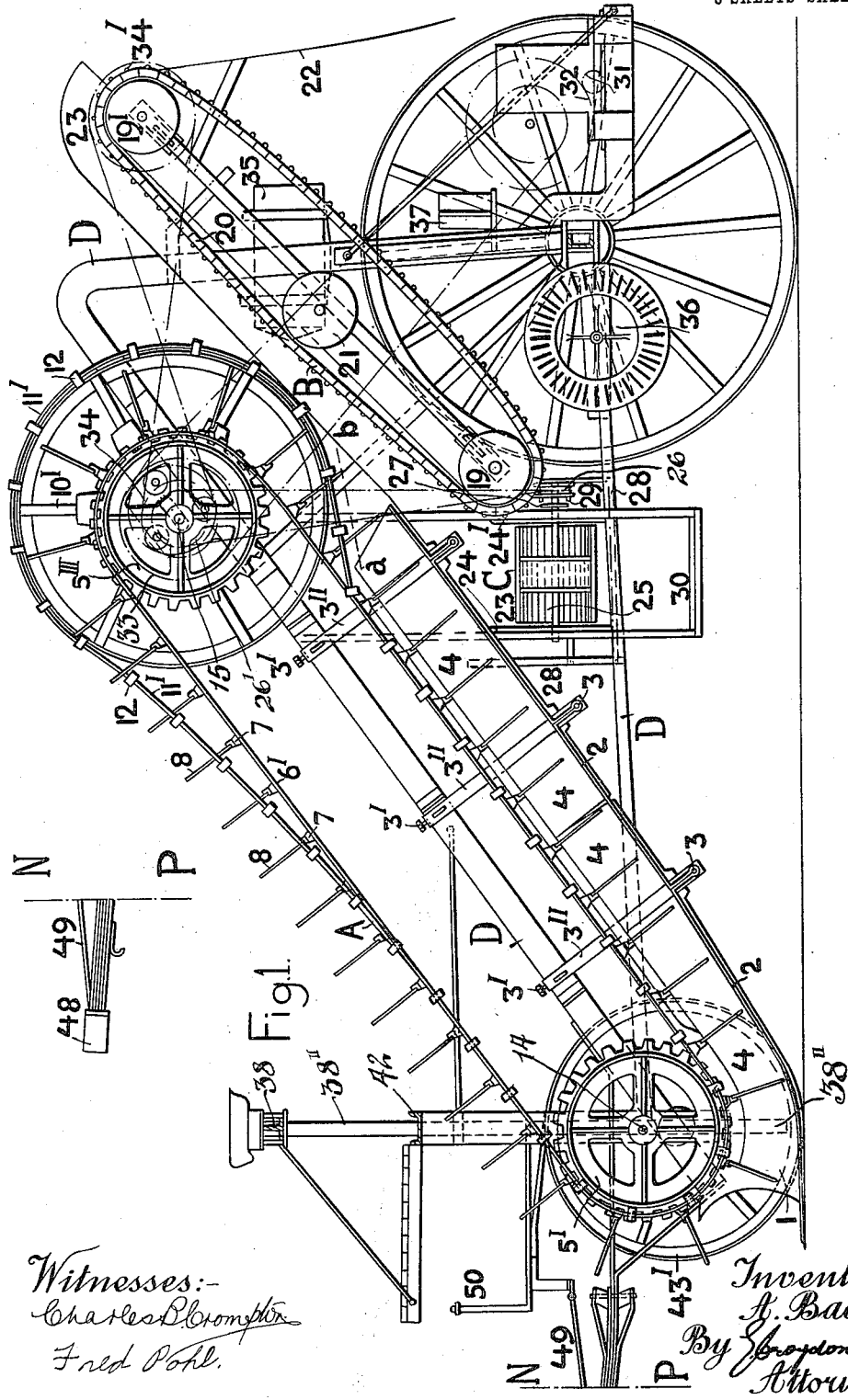

A. BAAS.
POTATO HARVESTER.
APPLICATION FILED NOV. 24, 1911.

1,032,175.

Patented July 9, 1912.
3 SHEETS—SHEET 3.

UNITED STATES PATENT OFFICE.

ALBERTUS BAAS, OF WILDERVANK, NETHERLANDS.

POTATO-HARVESTER.

1,032,175.  Specification of Letters Patent.  Patented July 9, 1912.

Application filed November 24, 1911. Serial No. 662,138.

*To all whom it may concern:*

Be it known that I, ALBERTUS BAAS, a subject of the Queen of the Netherlands, and residing at Wildervank, in the Province of Holland, in the Kingdom of the Netherlands, having invented certain new and useful Improvements in Potato-Harvesters, do hereby declare that the following is a specification.

This invention has for its object to provide an improved potato harvester of the class in which the devices for digging, sifting, cleaning and discharging the potatoes are worked by a motor mounted on the harvester, the entire harvester being drawn along by animal power.

In the improved harvester the several devices hereinafter mentioned are carried by a framework which is connected to its supporting truck in an independent manner so that it can be caused to rest with its whole weight upon the digging tool for digging, or it can be brought into dependence on the truck so as to allow the digging tool to be raised off the ground for transport of the harvester.

The improved harvester further comprises new means for raising and lowering the digging tool and coöperating parts to suit the nature of the soil and plants, and also improved means for sifting and cleaning the potatoes and conveying the loose soil and halm out of the harvester.

One construction of a harvester according to this invention is illustrated in the accompanying drawings in which:—

Figure 6:
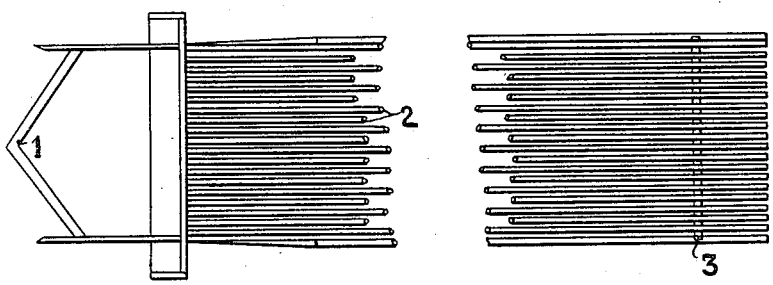
Figure 7:
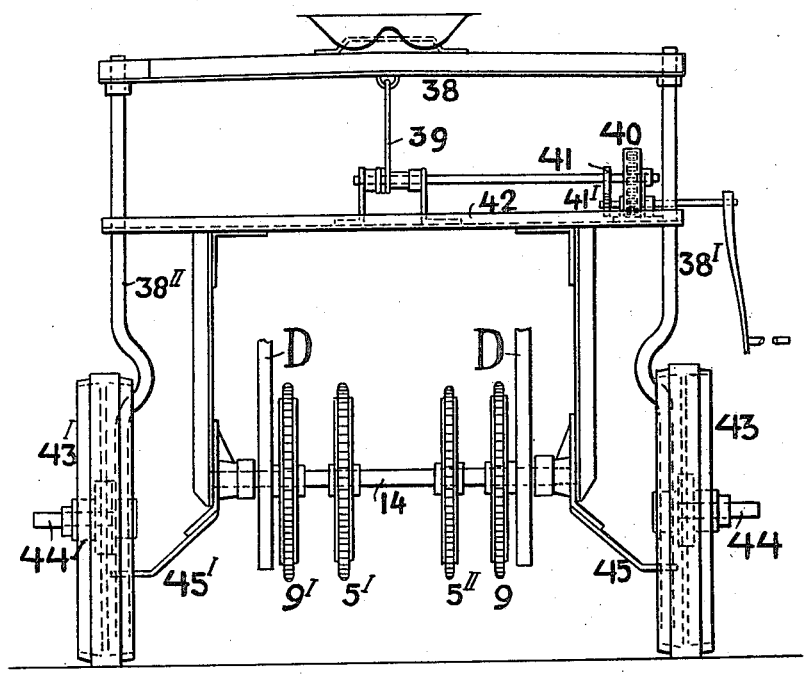

Figure 1 is a longitudinal section of the harvester, Fig. 2 is a plan of the steering mechanism, Figs. 3, 4, 5 and 6 are views of details of the harvester, and Fig. 7 is a front elevation of the steering mechanism.

As shown A indicates the device for digging up the potatoes and conveying them to the device B which has the function of removing the halm, roots, &c. From the device B the potatoes are caused by their shape and weight to pass on to a device C whereby the potatoes are filled into baskets, sacks or other receptacles placed in position for this puprose.

D indicates a truck composed preferably of two triangular side frames connected together by cross stays, so as to form a rigid structure. This truck is mounted on road wheels and carries a framework which supports the various devices. These devices are constituted as follows:—1 is the digging tool or share in the rear of which is a grating 2 composed of a number of bars capable of adjustment to any desired spacing (Fig. 6). These bars have eyes for the passage of rods 3 to fasten the bars together. By tightening the set screws 3' in the supports 3'' the grating 2 can be adjusted transversely to the frames of the truck D so as to set it at different distances from the conveyer. The side plates 4 form with the grate 2 a channel for the guidance of the dug out mass of soil and potatoes. $5'$, $5''$, $5'''$, $5^{iv}$ are chain wheels over which run chains 6, 6', whose links are connected to one another by cross pieces 7 on which a series of carriers 8 is arranged in rows staggered behind one another Fig. 3 in such a manner that the carriers sweep over the entire width of the grating 2. This arrangement has for its object to reduce the quantity of soil which has to be carried along without preventing the potatoes from remaining behind. In the drawings the carriers 8 are shown as consisting of flat strips set vertically on cross pieces 7, but they may also be arranged at an angle, and they may also be composed of spoon-shaped bars or elastic bars, according to the nature of the soil and the plants. 9, 9' are chain wheels and 10, 10' are guide wheels, over which run two additional chains 11, 11', whose links are connected together by cross pieces 12 that serve to clear the carriers 8 from halm, &c. This clearing is effected over the portion *a—b* of the course of the chain. The toothed wheels 5', 5'' have the same diameter as the wheels 9, 9', but the loose guide wheels 10, 10' have a greater diameter. Consequently both sets of chains 6, 6' and 11, 11′ run at equal speeds so that the carriers 8 and the cross pieces 12 have relative motion to one another only over the portion a—b, while they are entirely free and independent of one another over the remaining part of their course. The toothed wheels 5′, 5″ and 9, 9′ are mounted on a common shaft 14, and the guide wheels 10, 10′ of the chains 11, 11′ are mounted on loose pulleys 16′, 16″, 16‴ in the tensioning slide 17. The shaft 15 extends through the slot 18. The sets of chains 6, 6′ and 11, 11′ are arranged on the toothed wheels 5′, 5″ and 9, 9′ in such a manner that the two sets of chains will always run free and the clearing of the carriers 8 will always take place at a—b.

The conveyer B for the halm, lumps of soil, &c., consists of cross bars fixed side by side on an endless band 20 running over two pulleys or drums 19, 19′ and over one or more guide wheels 21. The cross bars of this band conveyer are furnished with knobs or spikes whereby the halm and roots which in the case of ripe potatoes are readily detached by the mere rolling of the potatoes, are separated out and thrown over the guard 22 on to the ground. Similarly any soil which has not been separated out during its passage over the grating 2, is thrown also over the guard 22. Side walls 23 forming a channel with the conveyer band B, are arranged at the two sides of the said band.

The conveyer C for the potatoes is arranged horizontally across the digging apparatus A and the halm conveyer B; it consists similarly of a number of cross bars arranged on an endless conveyer band 23 which passes over two drums. The channel whose bottom is formed by the band 23 is completed by the two side walls 24, 24′. A cord pulley 26 is mounted loose and capable of sidewise movement on the projecting end of the shaft 25, to which latter is fixed a double ended lever 27. By operating the belt shifter 28, the pulley 26 may be shifted on its shaft so as to cause the pin 29 to strike the double ended lever 27 and thus set the potato conveyer C in action. If the cord is crossed, the motion of the shaft 25 is reversed whereby the potato conveyer is also reversed. The potatoes can therefore be led either to the left or right as desired and be dropped into baskets, receptacles or the like placed for this purpose on a projecting board 30.

All the aforesaid devices are driven by the motor 31. The driving power is transmitted by the toothed wheel 32 to the wheel 33 for driving the digging device and the device for clearing the carriers 8. The power is transmitted thence by the wheels 34, 34′ to the halm conveyer and by the pulleys 26, 26′ to the potato conveyer. The motor comprises further a cooling water tank 35, a fuel tank (not shown) a water cooler with a fan 36, and an igniting apparatus 37.

The front part of the machine is suspended by means of a wire rope (or chain) 39 and windlass 40 from the framing rods 38, 38′, 38″ (Figs. 2 and 7). The windlass is mounted on the cross beam 42. The ends of this cross beam are perforated so as to embrace the rods 38, 38′, 38″ along which it is adapted to slide up and down. By operating the windlass the front part of the machine can be raised and lowered respectively for enabling the machine to run idle and for setting it to dig potatoes. The windlass can be locked by means of a pawl 41 engaging a ratchet wheel 41′.

The wheels 43, 43′ are mounted on pins that carry on their inner ends boxes or bushes in which the rods 38′, 38″ are fixed. Perforated supports 45, 45′ embrace the rods 38′, 38″ at their lower ends. These rods 38′, 38″ are capable of rotation and are connected to the steering apparatus by means of clips 46, 46′ which grip the cranks of the rods 38′, 38″.

47, 47′ are hooks engaging the rods 38′, 38″ in such a manner that when the steering apparatus connected to the drawbar 48 is rotated, this rotation is communicated by the rods 49, 50 to the clips 46, 46′ and the hooks 47, 47′ and therefore also to the rods 38′, 38″ and front wheels 43, 43′.

Having now described my invention what I claim as new and desire to secure by Letters Patent is:—

1. In a potato harvester, the combination of a digging tool, a grating, an endless potato chain with projecting pins for causing the potatoes to pass over said grating, and an endless clearing chain with cross pieces located behind said grating for clearing the halm from the projecting pins of said potato conveyer, as set forth.

2. In a potato harvester, the combination of a digging tool, a grating, an endless potato chain conveyer with projecting pins traveling over said grating, an endless clearing chain with cross pieces located behind said grating, and means for causing said cross pieces to move from base to point of the projecting pins of said potato chain conveyer whereby said projecting pins are cleared of the halm, roots and lumps of soil, as set forth.

3. In a potato harvester, the combination of a digging tool, a grating, an endless potato chain conveyer with projecting pins traveling over said grating, an endless clearing chain with cross pieces located behind said grating, and front and rear wheels over which said endless clearing chain runs, being respectively of the same and of greater diameter than the corresponding wheels of said potato conveyer, whereby the cross pieces of said clearing chain are caused to travel at the same speed and in the same direction as the potato conveyer pins at their bases, but in another direction behind said grating, so that they move with a clearing action toward the points of said potato conveyer pins, as set forth.

In testimony whereof I affix my signature in presence of two witnesses.

ALBERTUS BAAS.

Witnesses:
A. E. YURNIMAN,
A. C. NELSON.

Copies of this patent may be obtained for five cents each, by addressing the "Commissioner of Patents, Washington, D. C."